United States Patent
Rao et al.

(10) Patent No.: US 9,116,713 B1
(45) Date of Patent: Aug. 25, 2015

(54) SYSTEM AND METHOD FOR EXPRESSION EVALUATION IN A DISTRIBUTED NETWORKING ENVIRONMENT

(71) Applicant: EMC Corporation, Hopkinton, MA (US)

(72) Inventors: Raghavendra A. Rao, Bangalore (IN); Alan L. Foster, Pleasanton, CA (US)

(73) Assignee: EMC CORPORATION, Hopkinton, MA (US)

( * ) Notice: Subject to any disclaimer, the term of this patent is extended or adjusted under 35 U.S.C. 154(b) by 221 days.

(21) Appl. No.: 13/795,212

(22) Filed: Mar. 12, 2013

(51) Int. Cl.
*G06F 9/44* (2006.01)
*G06F 9/45* (2006.01)

(52) U.S. Cl.
CPC ........................................ *G06F 8/41* (2013.01)

(58) Field of Classification Search
USPC .......................................................... 717/146
See application file for complete search history.

(56) References Cited

U.S. PATENT DOCUMENTS

| 6,874,143 | B1* | 3/2005 | Murray et al. | 717/173 |
| 2010/0095284 | A1* | 4/2010 | Herring et al. | 717/148 |
| 2014/0189676 | A1* | 7/2014 | Mahajan | 717/170 |

* cited by examiner

*Primary Examiner* — John Chavis
(74) *Attorney, Agent, or Firm* — Dergosits & Noah LLP; Todd A. Noah

(57) ABSTRACT

Disclosed are systems and methods for evaluating expressions in a distributed networking environment. A data object associated with an expression may be retrieved. The data object may include intermediate code that is a compiled representation of the expression. A value of an identifier included in the intermediate code may be identified. The identifier may provide information about a version of a target system for which the intermediate code was compiled. A system component may determine whether the version of the target system for which the intermediate code was compiled is a current version of the target system by analyzing the value of the identifier. The intermediate code may be regenerated if the version of the target system for which the intermediate code was compiled is not current. The intermediate code might not be regenerated if the version of the target system for which the intermediate code was compiled is current.

20 Claims, 10 Drawing Sheets

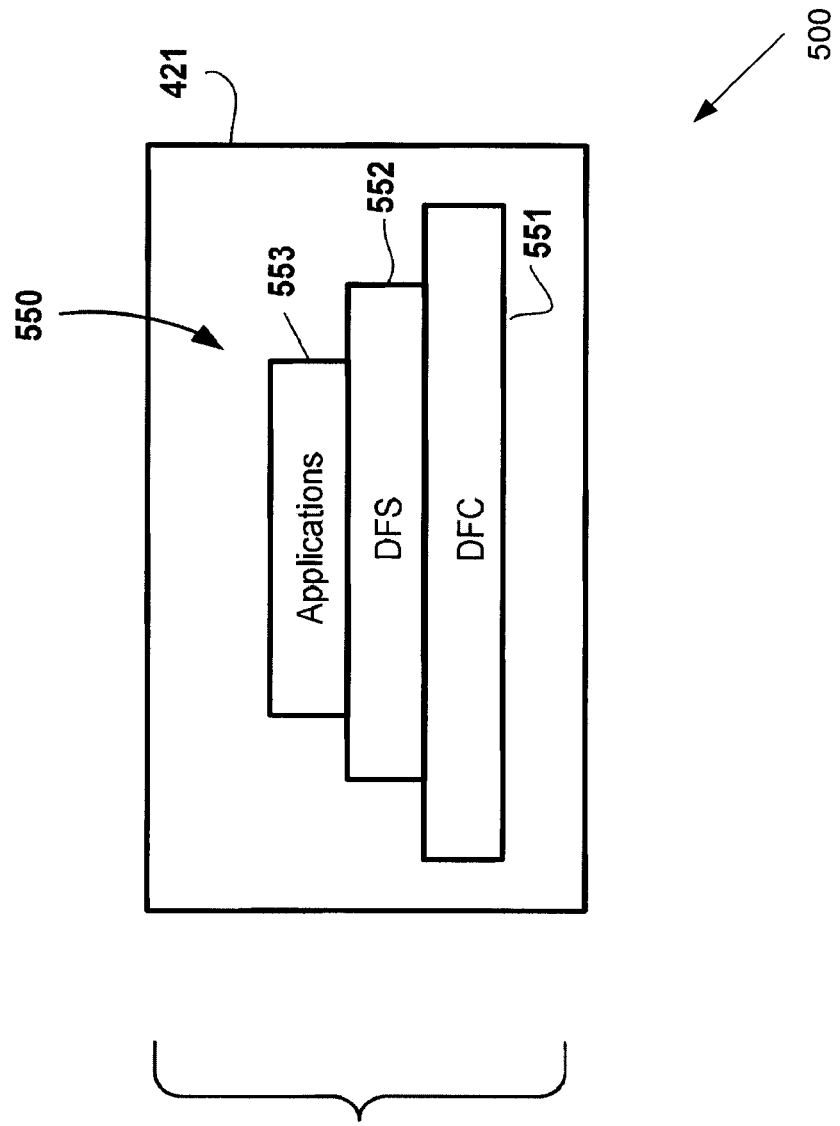
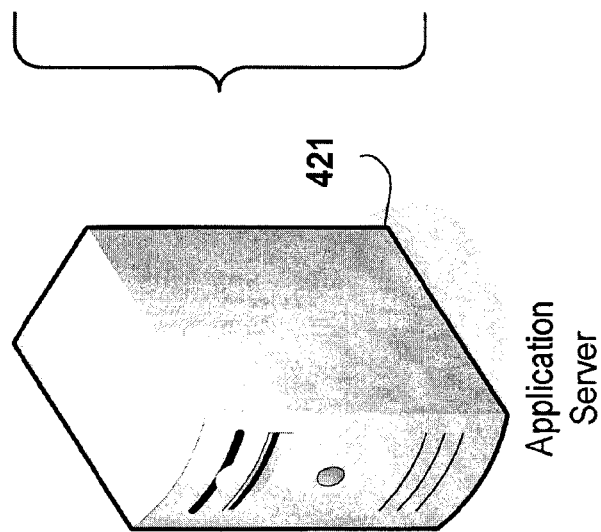
Figure 5
(prior art)

SYSTEM AND METHOD FOR EXPRESSION EVALUATION IN A DISTRIBUTED NETWORKING ENVIRONMENT

BACKGROUND

The present invention relates to the field of information technology and more particularly, systems and methods that relate to implementing software in a distributed networking environment.

A distributed networking environment may be used to provide one or more on-demand services, such as content management, to several users and organizations over a network. Thus, the distributed networking environment may include a content management system that may include a data repository. The users may establish communications sessions with the content management system to access the data repository. For example, the users may initiate one or more read and/or write operations to store and retrieve data to and from the data repository.

The platform underlying the distributed networking environment may change. For example, libraries used by a content management system to interpret workflows may change as new versions of software are implemented. Changes in system versions, such as changes in libraries or hardware components, may cause errors and unexpected behavior in workflows and lifecycles because the older workflows and lifecycles are designed to operate with the older version of the system.

Conventional methods remain limited because they do not provide methods and systems for dynamically updating older expressions in workflows and lifecycles as new systems are implemented.

BRIEF DESCRIPTION OF THE FIGURES

FIG. 5 shows an embodiment of an application server, implemented in accordance with some implementations.

DETAILED DESCRIPTION

Figure 1:
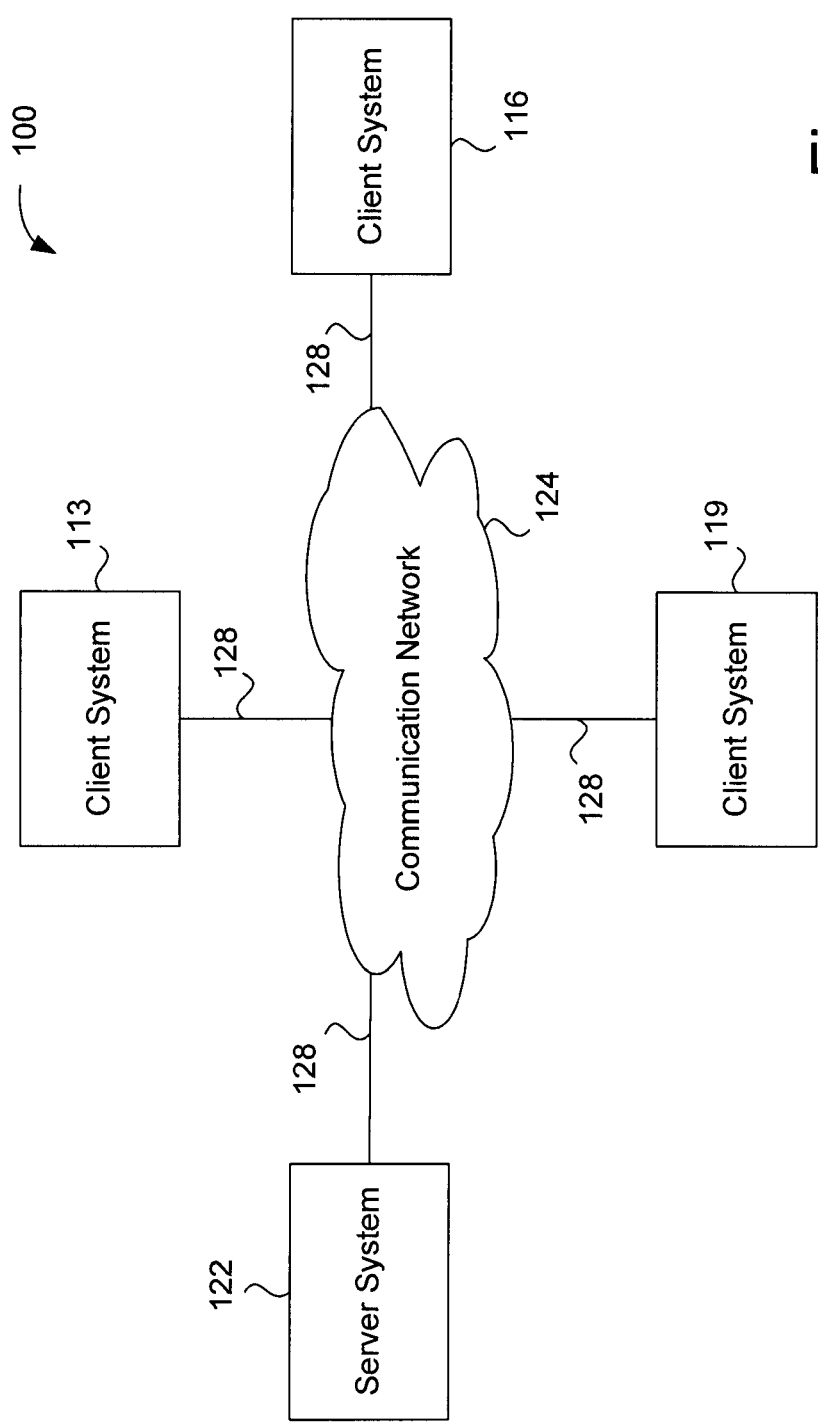
FIG. 1 shows a block diagram of a client-server system and network in which an embodiment of the invention may be implemented.

In a distributed networking environment that is used to provide on-demand services to customers and organizations, users may design workflows and lifecycles that may be used routinely to perform tasks and operations for the users' businesses. In some implementations, a workflow is a sequence of activities that represents a process implemented by an organization, such as an insurance agency reviewing an insurance claim, or an engineering firm performing a development process. Workflows may describe simple or complex processes. Thus, workflows may include a series of multiple steps and activities. Components of a workflow may occur serially and one after another, with one activity occurring at a time. Components of a workflow may also happen in parallel and concurrently. A workflow might combine serial and concurrent sequences. Furthermore, users may create lifecycles, which may be cyclical workflows in which the completion of an activity restarts a previously completed activity.

In one example, where multiple users use a content management service, the users may design workflows and lifecycles to control actions and pre-requisites for actions that interact with content stored in a data repository maintained by the content management service. The workflows may also be designed by third party consultants or designers. Thus, a user may specify a set of criteria, and a third party may design a workflow based on the criteria.

Workflows, and each of their respective components, may be implemented internally as data objects, such as expressions. An expression may be a combination of explicit values, constants, variables, operators, and functions that are interpreted according to one or more sets of rules for a particular programming language. Interpretation of an expression may be referred to herein as evaluation. In some implementations, the interpretation or evaluation of an expression may occur when source code that represents the expression is compiled into an intermediate byte code.

An example of an expression may be a step in a workflow used by an insurance agency reviewing an insurance claim. The step may involve checking a pre-condition associated with an insurance claim. Conditional constructs may be used to check a condition and proceed to another section of the expression using jump constructs if the condition is satisfied. For example, an expression may check if a particular action has been completed for an insurance claim, and update a status of the claim if the action has been completed. Thus, the expression may include conditional constructs such as, if action1='complete', then go to 'claim_approved'.

Expressions may be stored as one or more data objects in a database system that may be part of an on-demand environment used to provide on-demand services. In some implementations, the expressions are stored as content pages in a content management database system. Thus, expressions may be stored and made available as part of a content management service, such as Documentum®. A data object that stores an expression may include various data and code that implements one or more steps in a process that may be a workflow. Thus, a workflow may include a series of expressions and their respective evaluations, which may be stored in the same data object as their respective expressions, or stored separately.

In addition to designing workflows, as previously described, users may develop expressions as well. Thus, a user may generate source code and store the source code in a database system as part of an expression. Expressions may also be developed by third parties, such as third party vendors or consultants. As similarly discussed above, when an expression is provided by a third party, the third party provides the source code to the database system and the user is often not aware of and has no access to the source code underlying an expression that he or she may be using.

The code underlying expressions and workflows may be susceptible to changes in the system in which the code is implemented. For example, source code may be compiled by a compiler according to one or more libraries to generate and intermediate code. The intermediate code may be optimized for a particular platform or target machine. When the intermediate code is to be executed by a machine, an interpreter may be used to interpret the code and execute the code. If any component in the system changes, the expression may cease to function properly. Changes in a system may include software changes, such as changing from a 32 bit to a 64 bit library, operating system (OS), or any OS layer. Changes may also include physical changes, such as a change in a processor type. If a compiler or the libraries are changed, the intermediate code that is generated might not be interpreted properly by an older interpreter. Alternatively, if the interpreter is changed, older intermediate code might not be interpreted properly. Thus, an expression, and intermediate code for that expression, may be specific to the version of a system that it was designed for, where a version refers to a configuration or build of a system identified by the components within the system. Code written for a previous version of a system might not be compatible with a new version of a system. Accordingly, in systems, such as a content management system, where the underlying platform changes, expressions which control workflows and lifecycles may behave erratically and may cease functioning entirely when a new version is implemented.

Conventional methods do not provide an efficient or efficacious way to ensure compatibility of expressions among versions of a system. Conventional methods require a user to obtain all of the source code files for the user's expressions and re-compile them using a new compiler with new libraries. However, such manual recompilation is labor intensive and time consuming. Moreover, in many situations, the user isn't able to recompile the source code. For example, in a distributed computing environment where software applications are executed remotely, the user might not have the requisite access to shut down the system so that recompilation may occur. Moreover, the user might not have access to the source code files. In the instance where a third party has designed the source code, the user has never seen the source code and does not know where it is stored. Furthermore, conventional expressions do not provide any version information, so the user wouldn't know which expressions need to be recompiled. Further still, the user would not understand the logical structure of the intermediate code, so the user would not know how to make the relevant changes, recompile the code and place the new code in its correct place within the workflow environment.

Systems and methods are disclosed herein that automatically and dynamically regenerate expressions to ensure that the expressions are compatible with a current version of the system in which they are implemented. The regeneration or recompilation of expressions may be performed on-the-fly and according to a process that is transparent to the user. New intermediate codes may be generated for older expressions without any user intervention. In some implementations, an identifier is included in a header of the intermediate code. The identifier identifies a version that the intermediate code is designed for. During runtime, such as during a workflow, when the expression is called, the identifier may be analyzed. If the identifier indicates that intermediate code is designed for a current version of the system, the intermediate code may be executed. If the identifier indicates that the intermediate code is designed for an older system, the expression is flagged for recompilation. Source code for the expression may be recompiled using a new and current compiler and libraries to generate a new intermediate code. The new intermediate code may be stored in a database system and executed when the expression is invoked.

Prior to describing the subject matter in detail, an exemplary computer network in which the subject matter may be implemented shall first be described. Those of ordinary skill in the art will appreciate that the elements illustrated in FIG. 1 may vary depending on the system implementation. With reference to FIG. 1, FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
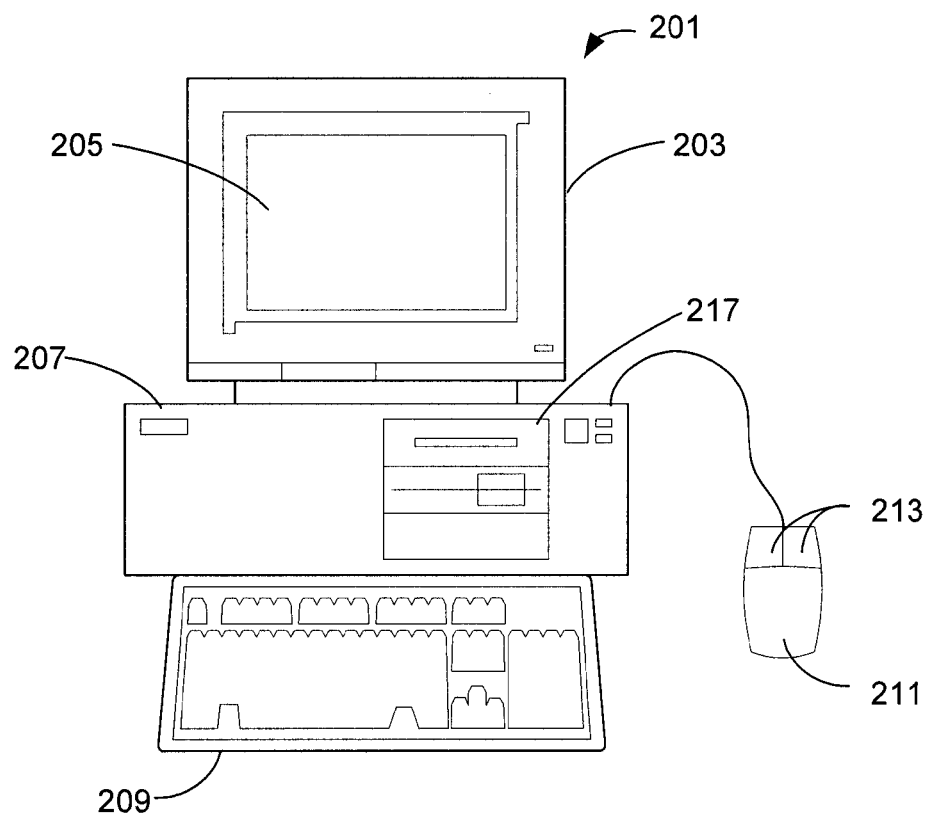
FIG. 2 shows a more detailed diagram of an exemplary client or computer which may be used in an implementation of the invention.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
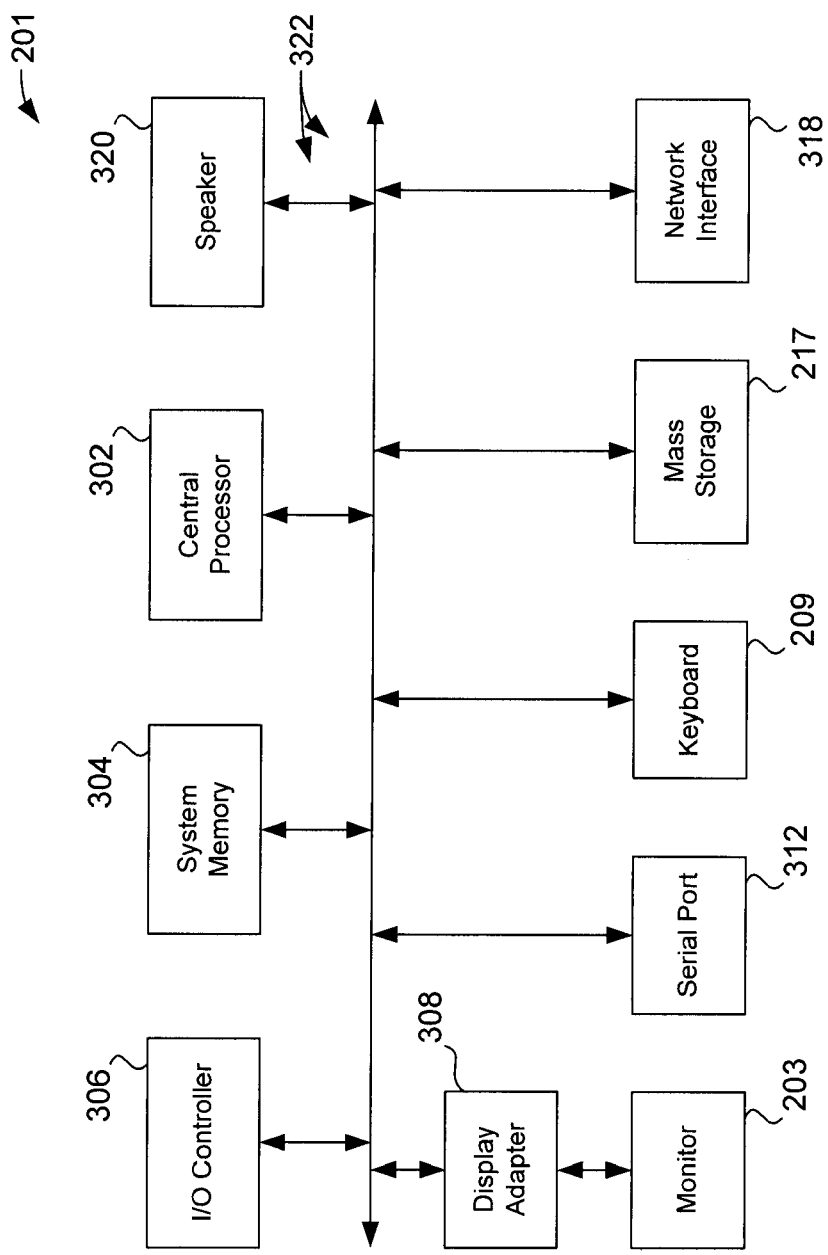
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
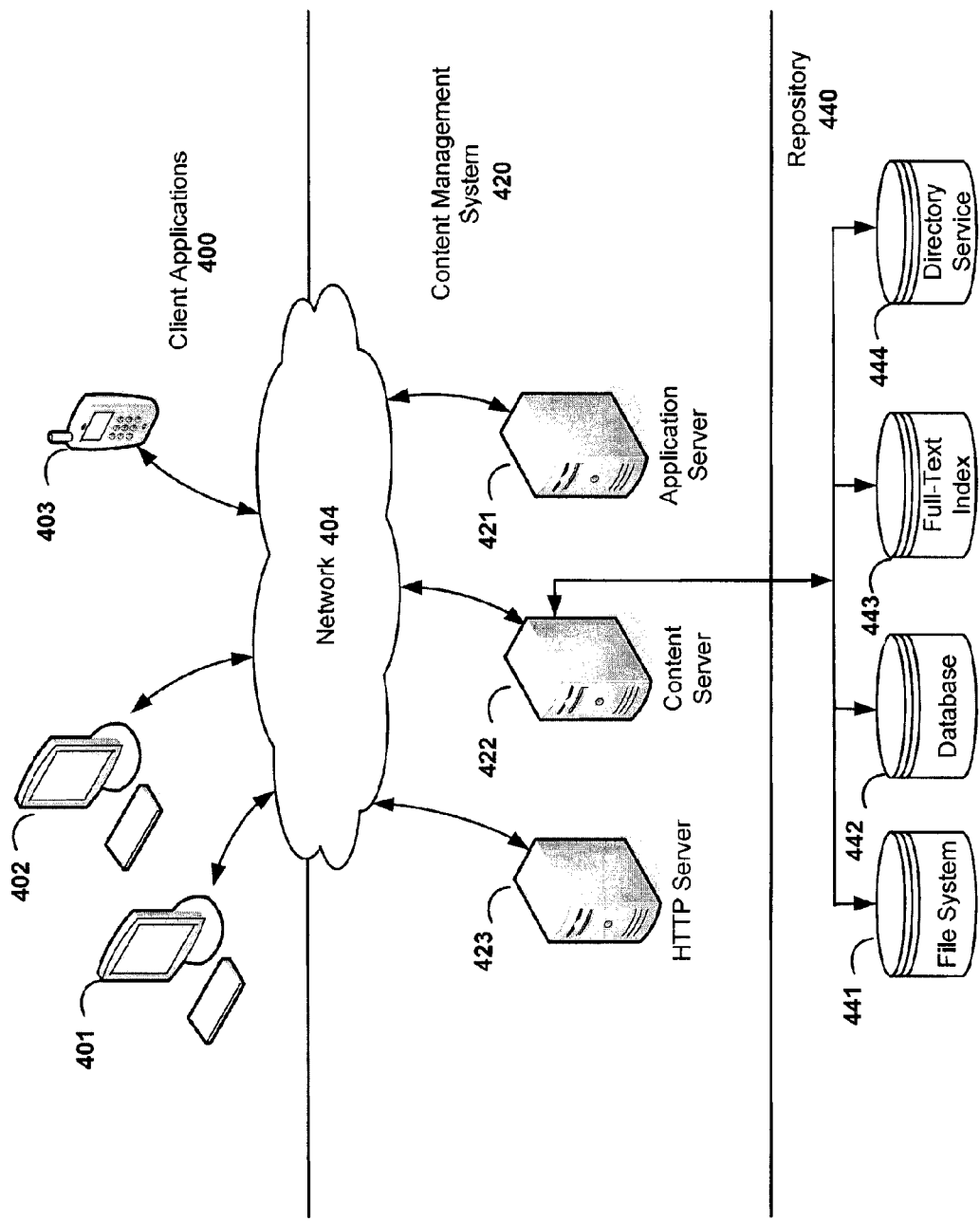
FIG. 4 illustrates a distributed client/server system, in accordance with some implementations.

FIG. 4 illustrates a distributed client/server system, in accordance with some implementations. The distributed client/server system may provide an enterprise-level content management and repository service. Repository system 440 is operated and managed by content management system 420, which in turn may provide access to the repository for client applications 400.

Client applications 400 may originate from client devices, such as devices 401, 402, 403, which communicate through network 404 with application server 421 to use one or more applications hosted on an application server. In one embodiment, network 404 is an Ethernet connection using TCP/IP communication methods with both client devices and server devices. However, other types of network connection technologies may also be used, including local area network (LAN), wide area network (WAN), storage area network (SAN), and the Internet. Client devices may be any type of processor-based digital device, such as desktop or laptop computer, iPhone® or other smart hand-held device.

Application server 421 hosts one or more applications running on a content management platform that provide access to repository 440 for clients hosted on content server 422, which is also accessible to clients via network 404. Hypertext transfer protocol (HTTP) server 423 is also coupled to network 404 to provide an administrative terminal for system operators to perform system maintenance, logging, and access control. A system operator may initiate a dormant state for server components to facilitate patches, upgrades, load balancing, and other operations.

Repository 440 is provided for use by client applications 400, through content server 422, which is accessible to the client devices through network 404. Repository 440 may include file store 441 for storing content items, relational database 442 for storing attributes/metadata associated with the content items, full-text index store 443 for storing the content items, and directory services 444.

A software platform runs on each of the various components, such as the EMC$^2$® Documentum® Platform software and related EMC$^2$ Enterprise Content Management software, distributed by EMC Corporation, Hopkington, Mass. The Documentum® Platform provides capabilities for managing enterprise content and is the foundation for related content management and case management product offerings.

FIG. 5 shows an embodiment of an application server, implemented in accordance with some implementations. For example, system 500 includes application server 421, which runs content management framework 550 having foundation layer 551, such as Documentum® Foundation Classes (DFC), interface layer 552, such as Documentum® Foundation Services (DFS), and one or more applications on application layer 553 having integrated Documentum® functionality through a Web Development Kit (WDK) or Webtop. HTTP server 523 runs a similar content management framework for applications such as System Administrator or Intranet Client.

DFC may be a programming interface that enables accessing the functionality of the Documentum® platform through Java and COM class libraries. DFC may underlie all Documentum® platforms. DFS may be an SOA development framework and application programming interface (API), based on web services, and designed to support interoperable machine-to-machine interaction over a network.

Each of clients 401, 402, 403 also runs a content management framework, with the API provided by the Documentum® Client Library (DMCL), which is a linked library inside the client application. The linked library may be a dynamic link library (DLL) in Windows, or alternatively a shared library in Unix. The DMCL may take documented API calls made by the client application and map them to Server RPC functions that may be executed by a content server. Once the API call has arrived inside the content server, processing is no longer affected by the DMCL environment. Thus, the DMCL thread that made the call may be dormant and wait for the results of the processing from the server. The Documentum® platform may also include an extensible Business Objects Framework (BOF) which may be built into DFC. BOF may provide a framework and methodology for developing reusable business logic components called Business Objects that may be plugged into middle tier or client applications.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 6:
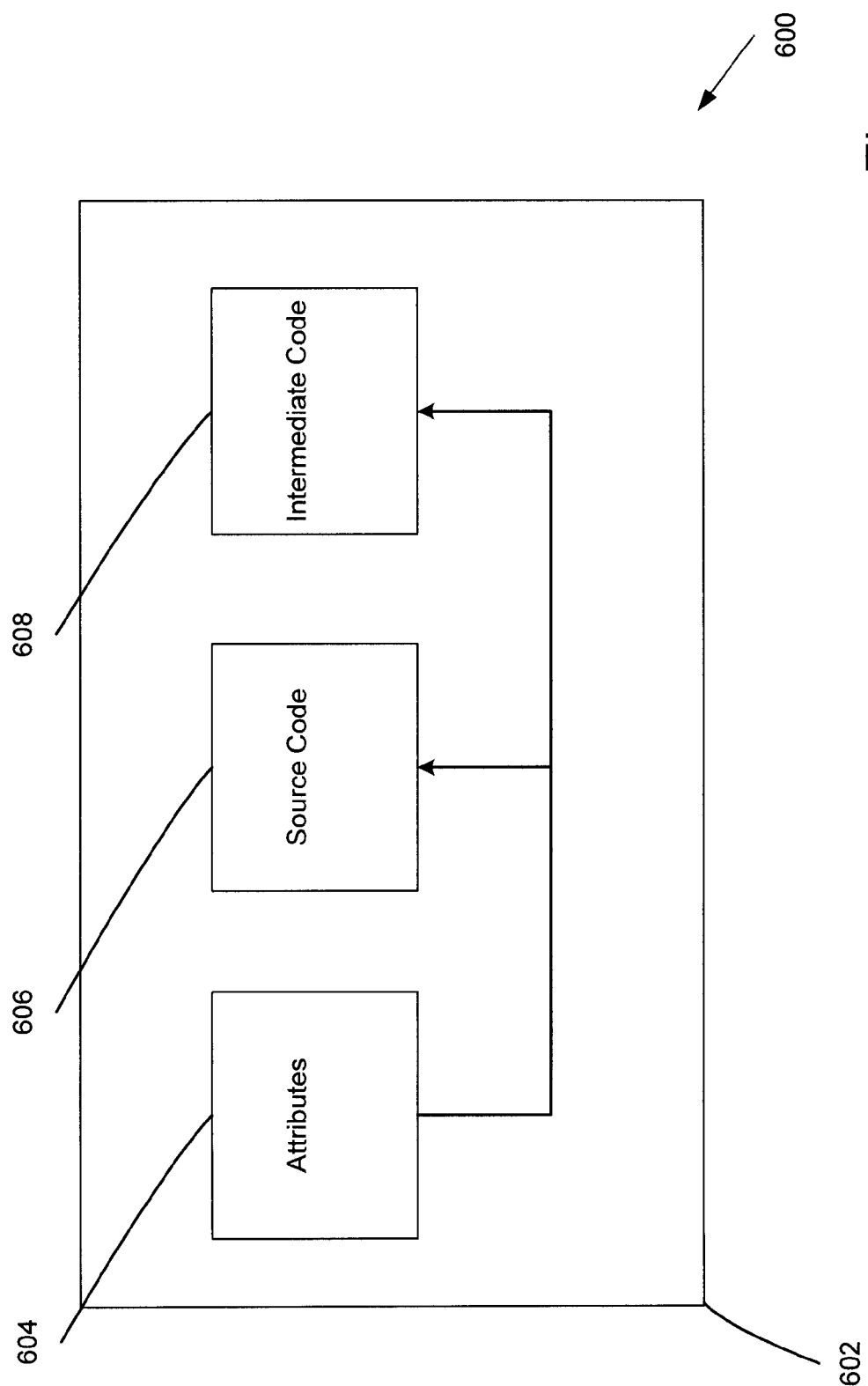
FIG. 6 illustrates a diagram of a data object that may be used to store an expression, in accordance with some implementations.

FIG. 6 illustrates a diagram of a data object that may be used to store an expression, in accordance with some implementations. As similarly discussed above, expressions which may be part of a workflow may be stored in data objects in a database system. The data objects may be persistent data objects stored as content pages in a content management system. The data objects may be accessed and evaluated during a workflow process to implement or execute one or more functionalities for the workflow process. The data objects may be configured to store different types of information associated with the expressions.

Accordingly, a data object that stores an expression, such as data object 602, may include attributes 604, which may include value attributes and behavior attributes that may define or specify properties, values, and behaviors associated with expression 602. Thus, attributes may include value attributes and behavior attributes that define and specify properties for each step or activity within a workflow.

Data object 602 may also include source code 606, which may be a series of computer instructions written or expressed in a language or representation a user may be able to understand. For example, the source code may be written in a computer language such as Java®, C, or C++. The source code associated with an expression may be code that was submitted by a user for the initial compilation and subsequent evaluation of the expression. Alternatively, the source code may have been developed and provided by a third party. In various implementations, source code representing an expression may be stored in a data object associated with the expression. For example, a content management system, such as Documentum® provided by EMC$^2$®, may store source code for each expression in the data object associated with the expression in a content management database system. Storing the source code in this way facilitates recovery and maintenance of the workflows that include or invoke the expressions.

Data object 602 may further include intermediate code 608, which may be an intermediate representation or byte code of source code 606. Intermediate code associated with an expression may be a binary representation of a runtime execution of the expression logic. Thus, the intermediate code may be code written in an intermediate language that includes conditional constructs, such as "if" and "then", loop constructs, such as "for" and "while", and jump constructs, such as "goto". The intermediate code may be generated by a compiler and stored for future use. Thus, intermediate code 608 may be generated by compiling source code 606. Accordingly, when the expression stored in data object 602 is called during a workflow or process, intermediate code 608 may be executed directly without having to re-compile source code 606.

Figure 7:
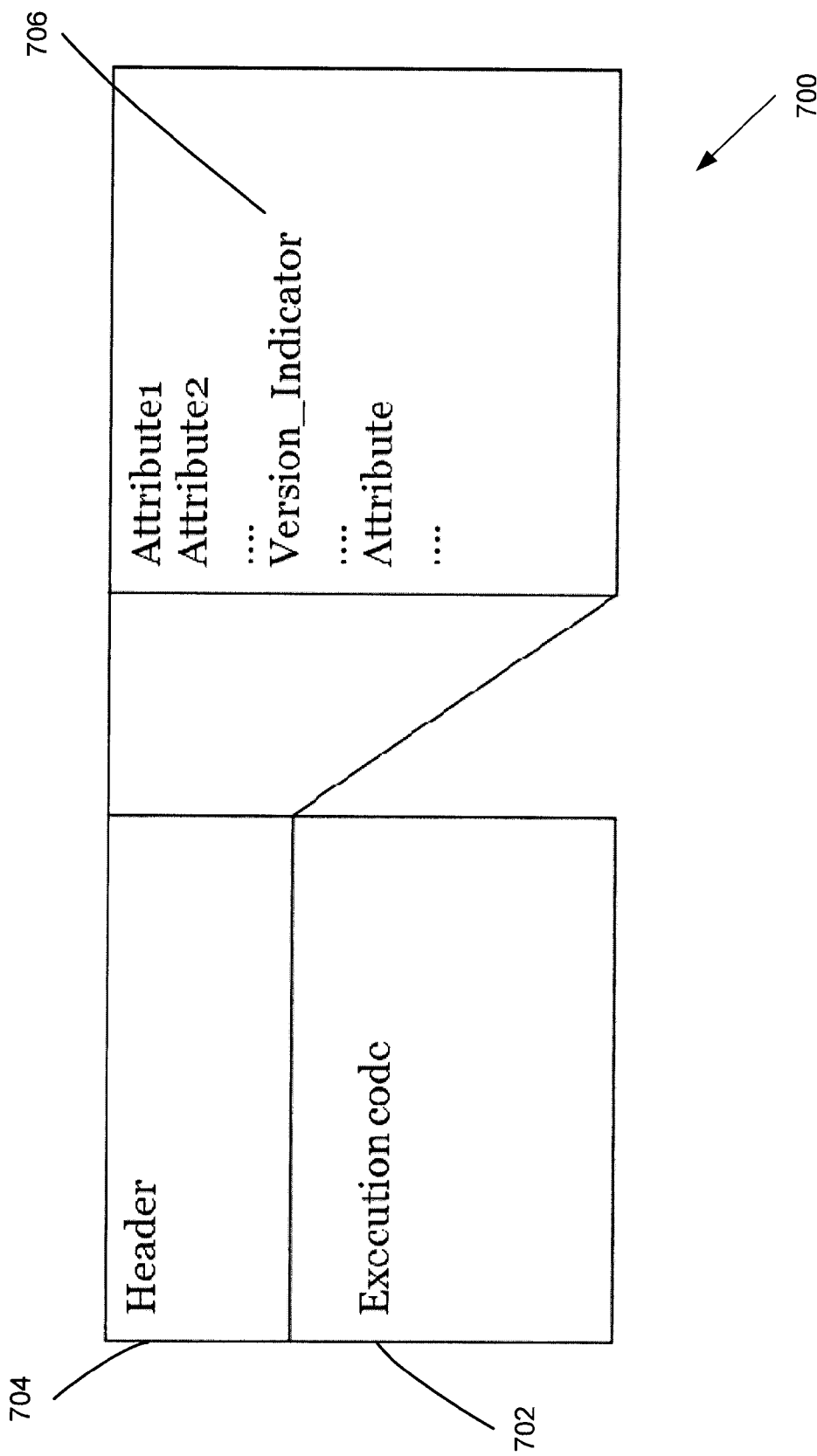
FIG. 7 illustrates a diagram of an example of a structure of an intermediate code file, in accordance with some implementations.

FIG. 7 illustrates a diagram of an example of a structure of an intermediate code file, in accordance with some implementations. Intermediate code may be stored as data objects, such as p-code files. The intermediate code files may be compiled versions of source code files. Thus, intermediate code files, such as p-code files, may be executable by a computer machine. In various implementations, the intermediate code files have a predetermined or defined structure or order in which information is stored and represented. For example, an intermediate code file may have different sections or portions dedicated to storing different types of information.

Accordingly, intermediate code file 702 may store executable code in body 702. The executable code may be compiled source code that, when executed, performs a step or process associated with an expression in a workflow. The executable code may be executable by a computer machine, such as a client machine used by a user. Intermediate code file 702 may further include header 704, which may store various attributes associated with executable code. Thus, one or more attributes that determine or define various properties of the executable code stored in intermediate code file 702 may be stored as header information in header 704.

Header 704 may also store one or more identifiers, such as identifier 706. In various implementations, identifier 706 provides software information associated with intermediate code file 702. For example, identifier 706 may indicate which version of software intermediate code file 702 was designed for. Thus, identifier 706 may include a data value, such as "Version_Indicator", that identifies which system intermediate code file 702 was designed for. For example, intermediate code file 702 may have been generated using a compiler configured to compile code for a 32-bit version of Windows®. In this example, "Version_Indicator" may be a data value that identifies the 32-bit version of Windows®. The data value stored in identifier 706 may be determined according to a predetermined mapping scheme. Thus, a software developer or system administrator may use a mapping scheme, such as an encoding scheme, which may generate one or more unique identifiers for known computing systems and operating systems. For example, an operating system that may be a 32-bit version of Windows® may be mapped to a unique binary sequence. During an evaluation process, a system component, such as the expression manager, may be configured to map the value identified by identifier 706 to a system version and determine whether or not the identified target system is current or suited for the system in which the expression will be used.

In one example, identifier 706 may be implemented as a single character or "Char" value which may represent the intermediate code file's target system in an encoded form. The character value may be an octet that includes 8 bits representing an encoded data value that identifies the target system. For example, a '3' may represent a 32 bit system, while a '6' may represent a 64 bit system.

In another example, identifier 706 may be implemented as a single bit to distinguish two types of systems. Thus, identifier 706 may be a single binary bit that functions a Boolean flag capable of toggling between two states. For example, if set to an asserted state, such as "TRUE", a new or current system may be identified. If set to an unasserted state, such as "FALSE", an old system may be identified.

In yet another example, identifier 706 may be implemented as an integer value that is capable of identifying two or more types of systems. Thus, the integer may be a value that designates "1" for a first system, "2" for a second system, and "3" for a third system. Thus, if multiple versions of a system have been implemented over a period of time, all versions may be represented by the encoding scheme used by identifier 706. The value of the integer may be incremented as new versions of the system are implemented.

In yet another example, identifier 706 may be derived by looking at one or more characteristics of the intermediate source code file. For example, an expression manager may analyze the length of the intermediate code file, the size of the header, and/or the size of signature or leading bytes included in the executable code. Signature bytes may be byte code that indicates the start of the executable portion of code. The bit-length or size of the code file, header, and signature bytes may be indicative of what the intermediate code's target system is. For example, a system, such as a content management system, may have been recently upgraded to 64 bit libraries. If the size of the header for an intermediate code file is 32 bits, then an expression manager may infer or determine that the intermediate code file's target system is a 32 bit system. The expression manager may further determine that the intermediate code is old code that is not current, and that the old code may cause execution errors if it is not regenerated.

Figure 8:
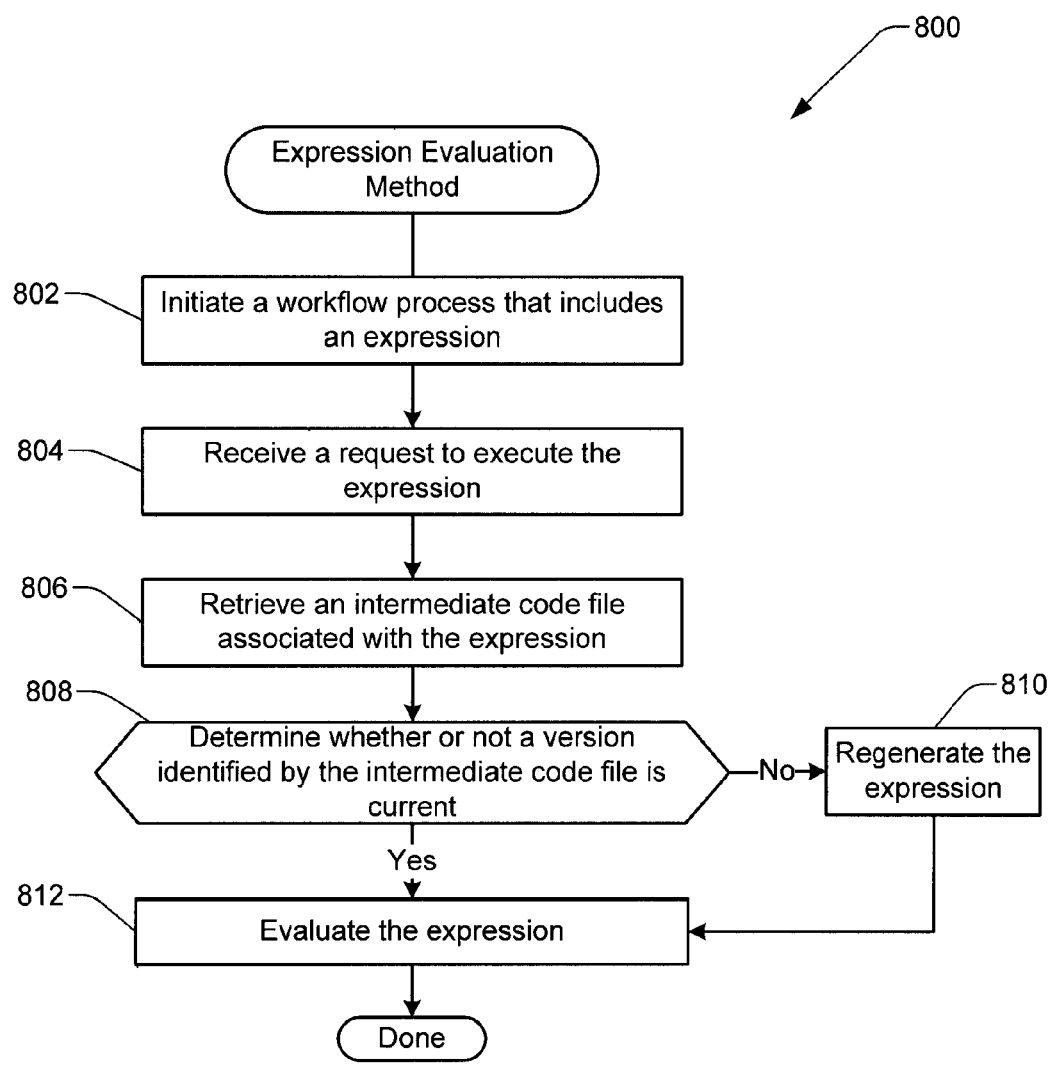
FIG. 8 shows a flowchart of an example of a method for evaluating expressions, performed in accordance with some implementations.

FIG. 8 shows a flowchart of an example of a method for evaluating expressions, performed in accordance with some implementations. The evaluation of expressions may be performed by a system component, such as an expression manager. The expression manager may be process or application implemented in one or more servers of a content management system. The expression manager may be configured to analyze the expressions and execute the expressions subsequent to the analysis. The expression manager may be configured to check a version indicated by one or more data values in an intermediate code file, such as a version indicator. As set forth above with reference to FIG. 7, an intermediate code file may include a header, which may further include a version indicator. The expression manager may analyze the version indicator and determine whether the intermediate code file should be evaluated and executed, or regenerated beforehand. The expression may be analyzed, regenerated, and evaluated dynamically and in real time according to a process that is transparent to a user.

At step 802, a workflow process may be initiated. As similarly discussed previously, a workflow may be a sequence of activities that represents a process implemented by an organization. The workflow may include multiple expressions, which may each represent a step or component within the workflow. Accordingly, a workflow process may be initiated, and one or more expressions may be called and evaluated. For example, a workflow for processing a loan application may be initiated, and expressions may be called and evaluated as a loan agent reviews the loan application, and performs and completes different parts or tasks within the loan application's respective workflow.

Accordingly, at step 804, a request to execute an expression may be received. Thus, once the workflow progresses to a particular point or step in an operational process, an expression associated with that point or step may be called. The request may include an identifier which may be used to identify one or more data objects associated with the expression that has been called. For example, the identifier may be a unique object identifier that identifies a data object used to store the expression that has been called. The identifier may have been previously determined by a software developer or an automated process, such as a development tool, during the initial configuration of the workflow. The data object identified by the unique identifier may store attributes, source code, and intermediate code, as similarly discussed above with reference to FIG. 6. The request may be issued by one or more components of a content management system used to manage the workflow and the user's interactions with the workflow. The request may be received by a system component, such as an expression manager, which may be incorporated as part of the content management system, or alternatively, a standalone process which may be called on-demand and dynamically.

At step 806, an intermediate code file associated with the expression may be retrieved. Accordingly, one or more data objects used to store the expression may be analyzed to retrieve an intermediate code file that may be stored in the data object. As previously discussed, the intermediate code file may be a previously compiled representation of the expression. In some implementations, the expression manager uses an identifier included in the request received at step 804 to identify a data object stored in a content management system that stores data for the requested expression. The expression manager may retrieve the entire data object and extract an intermediate code file. Alternatively, the expression manager may query the data object and directly retrieve the intermediate code file.

At step 808, it may be determined whether or not a version identified by the intermediate code file is current. As discussed before, intermediate code that was compiled to operate on an older version of a system may not execute properly on newer versions of the system. Thus, a system component may verify whether or not the intermediate code is current to prevent version-related execution errors from occurring. Accordingly, a system component, such as an expression manager, may parse and analyze information included in the intermediate code file. As similarly discussed with reference to FIG. 7, the intermediate code file may include information, such as a version indicator, that identifies what version of a system the intermediate code file has been designed or compiled to operate with. The expression manager may compare the version identified by the intermediate code file with one or more data values that identify a current version of a system.

Information identifying a current version of the system may be obtained from one or more different sources. For example, data identifying a current version may be retrieved from information maintained by a system administrator. Thus, the system administrator may create and maintain a list in which he or she enters one or more data values that specify a current version of the system. The data values may form the basis of the identifier, such as a version indicator, generated and implemented as discussed above with reference to FIG. 7.

The information identifying a current version may also be retrieved from information stored and maintained by the content management system itself. The files managed by the content management system and the software deployed to provide content management services may each have an associated bit width. For example, the software application that has been deployed to provide content management services may be a 32 bit version of the application. A system component, such as an expression manager, may infer or determine a version based on the bit width. Accordingly, if a new 64 bit version of the software application has been implemented, the expression manager may identify this new version as the current version by analyzing the software application that has been deployed and/or files managed by the software application.

The information identifying a current version may be retrieved from information maintained by the system as a system-wide property. For example, a current version identifier may be stored in a system registry, such as a Windows® registry, or as a kernel parameter, such as a Unix kernel parameter. The information may also be retrieved from information maintained by system hardware as a hardware property. For example, a computer machine implemented in the system may store and maintain a current hardware configuration of the computer machine. The hardware configuration information may indicate that the computer machine has a 32-bit processor. A system component, such as an expression manager, may query the computer, retrieve this information, and determine a system version based on the retrieved information. Information identifying a current version may also be retrieved from information external to the system. For example, an external file or website may be queried and system version information may be determined based on the results of the query.

The information identifying a current version may also be derived from various system resources or components. In some implementations, the data identifying a current version is derived from a runtime environment associated with one or more expressions used in a workflow. For example, the size of pointers used in the runtime environment may identify a 32 bit version, a 64 bit version, or some other compiler defined value.

If it is determined that the identified version is not current, at step 810 a process for regeneration of the expression may be initiated. For example, if a system component, such as an expression manager, detects that the intermediate code is not targeted for the current version of the system that will execute the executable portion of the intermediate code, the expression manager may invoke an expression regeneration process, as discussed in greater detail with respect to FIG. 9. Thus, the expression manager may use current version information to re-compile the intermediate code for the requested expression. In various implementations, this is done dynamically and during real-time. Thus, an older version of intermediate code for an expression may automatically be updated to a current version in real-time and while a user is performing one or more tasks in a workflow. Moreover, the process may be transparent to the user. Thus, the new version of the intermediate code may be generated without any user intervention. Once the expression has been re-generated, the expression may be evaluated, as discussed in greater detail below with reference to step 812.

Returning to step 808, if it is determined that the version of the retrieved intermediate code is current, the expression manager may determine that regeneration of the code is not needed, and proceed to use the retrieved intermediate code to evaluate the expression that was requested at step 804. Accordingly, at step 812, the expression manager may evaluate the expression that was requested at step 804 by executing the current version of the intermediate code. Alternatively, the expression manager may send the current version of the intermediate code to a different system component, computing resource, or a client machine for subsequent execution at a different, remote, or local location. In this way, the expression may be evaluated and the workflow may continue operating.

Figure 9:
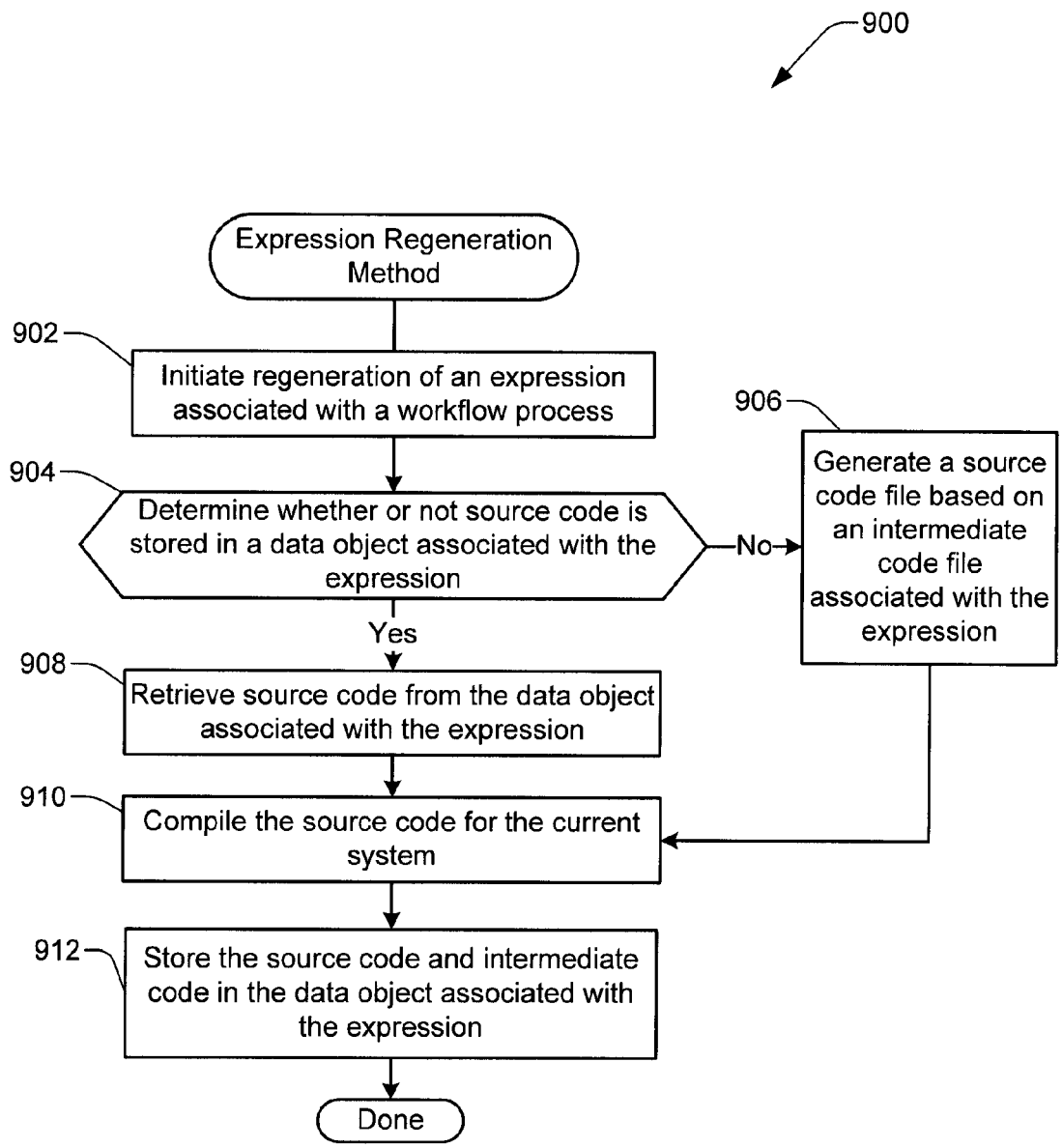
FIG. 9 shows a flowchart of an example of a method for regenerating expressions, performed in accordance with some implementations.

FIG. 9 shows a flowchart of an example of a method for regenerating expressions, performed in accordance with some implementations. In various implementations, the process of regenerating expressions may be performed dynamically and on-the-fly. Thus, expressions may be regenerated on-demand and in response to a system component, such as an expression manager, determining that intermediate code for an expression is not current. Furthermore, the regeneration process does not require any user intervention and may be performed transparently by one or more components of the content management system, such as the expression manager. Thus, intermediate code associated with expressions may be regenerated and made current according to a process which does not incur any down-time in a production environment in which a workflow is deployed, and does not require manual recompilation of source code. In this way a newly implemented production system or workflow may seamlessly use older expression code.

Accordingly, at step 902, regeneration of an expression may be initiated. As set forth in FIG. 8, a system component, such as an expression manager, may determine that intermediate code associated with an expression does not match a current version of the system. In response to determining that the intermediate code is not current, the expression manager may initiate a process to regenerate the expression by regenerating intermediate code associated with the expression. This may occur dynamically and on-the-fly. Accordingly, the process of regeneration of the expression may be initiated as part of or during the workflow process to which the expression belongs.

At step 904, it may be determined whether or not source code is stored in a data object associated with the expression. As described above with reference to FIG. 6, each expression may be stored in a data object along with its associated source code. Storing the source code for an expression in this way facilitates subsequent modification of expressions and workflow processes. Thus, according to some implementations, the expression manager may attempt to obtain the source code that was originally stored in the data object so that the source code may be recompiled as a version of intermediate code that is targeted to the system's current version.

If it is determined that source code is not stored in the data object, at step 906, a source code file may be generated based on an intermediate code file. In some implementations, a recovery agent may reconstruct a source code file based on the intermediate code file. The recovery agent may be configured to implement a process of reverse-compilation or decompilation to convert the intermediate code to source code. Thus, the recovery agent may be provided with version information, such as a version indicator retrieved from the intermediate code file. The version information may be provided by the expression manager after the expression manager has extracted the version information from the intermediate code file. Alternatively, the recovery agent may be configured to analyze the header of the intermediate code file and identify a version associated with the intermediate code. The recovery agent may select and implement one or more recovery processes based on the identified version. For example, if the version indicator indicates that the intermediate code file was compiled for a 32 bit system, the recovery agent may implement one or more recovery processes designed to reverse actions taken by a compiler targeted at a 32 bit system. Upon the completion of the recovery process, a new source code file may be generated. The new source code file may be transmitted to a compilation program, such as a compiler, as discussed in greater detail below with reference to step 910.

Returning to step 904, if it is determined that source code is stored in the data object, the source code may be retrieved at step 908. Accordingly, the data object used to store the expression may be analyzed to retrieve the source code associated with the expression. As previously discussed, the source code file may be a series of computer instructions that may have been initially provided by a user or a third part and stored in a database system, such as a content management system. Accordingly, a system component, such as an expression manager, may retrieve the entire data object and extract a source code file. Alternatively, the expression manager may query the data object and directly retrieve the source code file. The retrieved source code file may be transmitted to a compiler for recompilation.

At step 910, the source code may be compiled for the current system. Thus, the source code file may be sent to a compiler configured to compile source code files for use in the current version of a system, such as a content management system. The compiler may generate a new intermediate code file based on the source code file. The new intermediate code file may be compiled according to the newest and current version of the system and its associated libraries. Therefore, if the new intermediate code is subsequently evaluated and executed, it will be compatible with the libraries that are currently used, and will not incur any execution errors or erratic behavior. Moreover, the new intermediate code file may be modified to include an identifier in a header section. The identifier may be a version indicator that identifies the current version of the system, and indicates that the new intermediate code was compiled by a compiler targeted to that system.

At step 912, the source code and the intermediate code may be stored in the data object associated with the expression. Accordingly, the new intermediate code file and its associated source code file may be stored back in a database system, which may be part of the content management system. Once stored, the new intermediate code may be accessible by other processes in the system, and may be used as part of a workflow process. As set forth above, this may occur dynamically and on-demand. Thus, once the new intermediate code file has been stored, it may be used during evaluation of the expression that was initially requested. Accordingly, the expression may be evaluated, the code may be executed, and the workflow process may continue in real-time without having to shut down any software components in the system.

Figure 10:
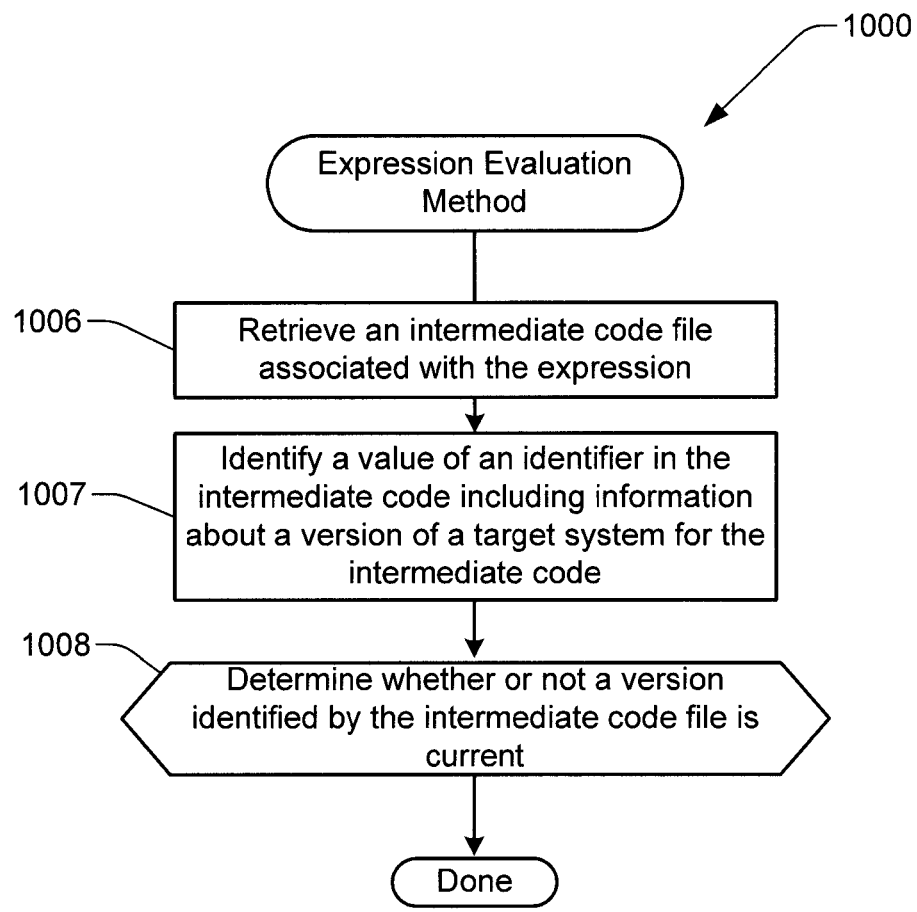
FIG. 10 is a flowchart of an alternative example of a method for regenerating expressions, performed in accordance with some implementations.

FIG. 10 is a flowchart illustrating another example of a method 1000 for evaluating expressions, performed in accordance with some implementations, for example, using an expression manager.

At step 1006, an intermediate code file associated with the expression may be retrieved, for example, by analyzing one or more data objects used to store the expression. The intermediate code file may be a previously compiled representation of the expression. In some implementations, the expression manager uses an identifier included in the request to identify a data object stored in a content management system that stores data for the requested expression. The expression manager may retrieve the entire data object and extract an intermediate code file, or may query the data object and directly retrieve the intermediate code file.

The intermediate code file may include information, such as a value corresponding to the version of a system the intermediate code file has been designed or compiled to operate with, and that value is identified in step 1007. The expression manager may compare the version identified by the intermediate code file with one or more data values that identify a current version of a system. Information identifying a current version of the system may be obtained from one or more different sources, as discussed with reference to FIG. 8.

At step 1008, it is determined whether or not the version of the retrieved intermediate code is current. If the version is not current, then a process for regeneration of the expression may be run by the expression manager. If the version is current, then the expression manager will proceed to execute the retrieved intermediate code to evaluate the expression, or alternatively, the expression manager may send the current version of the intermediate code to a different system component, computing resource, or client machine for execution and evaluation.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method for evaluating an expression in a distributed networking environment, the method comprising:
    retrieving a data object associated with an expression, the data object including intermediate code that is a compiled representation of the expression, the expression being a task or activity in a workflow;
    identifying a value of an identifier included in the intermediate code, the identifier providing information about a version of a target system for which the intermediate code was compiled; and
    determining whether the version of the target system for which the intermediate code was compiled is a current version of the target system by analyzing the value of the identifier.

2. The method of claim 1, wherein the intermediate code is regenerated in response to determining that the version of the target system for which the intermediate code was compiled is not a current version of the target system.

3. The method of claim 2, wherein the intermediate code is regenerated by using a current version of a compiler to recompile source code representing the expression.

4. The method of claim 3, wherein the source code representing the expression is stored in the same data object as the intermediate code.

5. The method of claim 1, wherein the intermediate code is not regenerated in response to determining that the version of the target system for which the intermediate code was compiled is a current version of the target system.

6. The method of claim 1, wherein the identifier comprises one or more data values stored in a header of a file that includes the intermediate code.

7. The method of claim 1, wherein the identifier is a Boolean value represented by a flag that may be set to either "TRUE" or "FALSE".

8. The method of claim 1, wherein the identifier is a character value that may be set to either "3" or "6".

9. The method of claim 1, wherein the identifier is an integer, and wherein the value of the integer is determined based on the version of the target system for which the intermediate code was compiled.

10. The method of claim 1, wherein the identifier is derived based on one or more characteristics of the intermediate code.

11. The method of claim 10, wherein the one or more characteristics of the intermediate code are selected from the group consisting of: a length of the intermediary code, a size of a header included in the intermediary code, a size of leading bytes included in the intermediary code.

12. The method of claim 1, wherein the retrieving, identifying, and determining are performed dynamically and while the workflow is in progress.

13. A non-transitory machine-readable medium carrying one or more sequences of instructions which, when executed by one or more processors, cause the one or more processors to carry out the steps of:
    retrieving a data object associated with an expression, the data object including intermediate code that is a compiled representation of the expression, the expression being a task or activity in a workflow;
    identifying a value of an identifier included in the intermediate code, the identifier providing information about a version of a target system for which the intermediate code was compiled; and
    determining whether the version of the target system for which the intermediate code was compiled is a current version of the target system by analyzing the value of the identifier.

14. The machine-readable medium of claim 13, wherein the intermediate code is regenerated in response to determining that the version of the target system for which the intermediate code was compiled is not a current version of the target system, and wherein the intermediate code is regenerated by using a current version of a compiler to recompile source code representing the expression.

15. The machine-readable medium of claim 13, wherein the intermediate code is not regenerated in response to determining that the version of the target system for which the intermediate code was compiled is a current version of the target system.

16. The machine-readable medium of claim 13, wherein the retrieving, identifying, and determining are performed dynamically and while the workflow is in progress.

17. A system for evaluating an expression in a distributed networking environment, the system comprising:
    a processor; and
    one or more stored sequences of instructions which, when executed by the processor, cause the processor to carry out the steps of:
        retrieving a data object associated with an expression, the data object including intermediate code that is a compiled representation of the expression, the expression being a task or activity in a workflow;
        identifying a value of an identifier included in the intermediate code, the identifier providing information about a version of a target system for which the intermediate code was compiled; and
        determining whether the version of the target system for which the intermediate code was compiled is a current version of the target system by analyzing the value of the identifier.

18. The system of claim 17, wherein the intermediate code is regenerated in response to determining that the version of the target system for which the intermediate code was compiled is not a current version of the target system, and wherein the intermediate code is regenerated by using a current version of a compiler to recompile source code representing the expression.

19. The system of claim 17, wherein the intermediate code is not regenerated in response to determining that the version of the target system for which the intermediate code was compiled is a current version of the target system.

20. The system of claim 17, wherein the retrieving, identifying, and determining are performed dynamically and while the workflow is in progress.

* * * * *